Patented June 14, 1932

1,862,843

UNITED STATES PATENT OFFICE

JOSEPH DEINET, OF MILWAUKEE, AND ROBERT J. GOODRICH AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

HALOGENATED INDANTHRONES AND PROCESS OF PREPARING THE SAME

No Drawing.   Application filed July 1, 1929.   Serial No. 375,317.

This invention relates to a process of preparing vat dyestuffs of the N-dihydro-1,2,2',1'-anthraquinone azine series and to the dyestuffs so produced. More particularly, the invention relates to the preparation of halogenated indanthrones by the treatment with clorinating agents of halogenated N-dihydro-1,2,2',1'-anthraquinone azines containing bromine in at least one of the 3-positions.

The importance of anthraquinone hydro azine compounds as vat dyestuffs has long been recognized on account of the clear, blue shade that they produce on cotton and on account of their excellent fastness to light and washing. The parent material of the series, viz. dihydro-anthraquinone azine, possesses these properties in common with the other members of the series, together with the property of being suitable for use in printing goods. Dihydro-anthraquinone azine, however, is relatively sensitive to the action of bleaching agents, the shade of the dyestuff being turned considerably greener. This property of being sensitive to bleaching agents varies considerably in the various members of the series and, in general, fastness to bleaching is increased by the introduction of halogen into the molecule of the compound. While the introduction of halogen into the molecule of the indanthrone compound is accomplished without substantially affecting the normal shade of the dyestuff, viz, blue on cotton, if said halogenation is carried out to a sufficiently high degree to obtain good fastness to bleaching, it affects materially the dyeing and printing properties of the resulting dyestuff.

3,3'-dibromo-N-dihydro-1,2,2',1'-anthraquinone azine is a typical halogen-containing indanthrone which can be produced rather economically and which has very excellent properties with respect to fastness to light, washing and bleaching. It has, however, been impossible to introduce successfully this dyestuff to the trade for the reason that its leuco body in the dye bath is so insoluble that it cannot be successfully utilized in ordinary commercial dyeing processes.

It is therefore an object of this invention to provide a process of preparing halogenated indanthrones having the combined properties of being remarkably fast to bleaching agents and giving a more soluble vat and dyeing stronger tints under large scale practical dyeing conditions than 3,3'-dibromo-N-dihydro-1,2,2',1'-anthraquinone azine.

We have now found that the quality of a halogenated N-dihydro-1,2,2',1'-anthraquinone azine with respect to its dyeing and printing properties is largely dependent not only upon the nature of the halogen, that is, whether chlorine or bromine, but upon the position of the halogen atom or atoms in the molecule. In general, the 3,3'-dihalogen substituted N-dihydro-1,2,2',1'-anthraquinone azines are faster to bleach than the ones in which the halogen is otherwise located and the corresponding chlorinated N-dihydro-1,2,2',1'-anthraquinone azines of this group are more soluble in the dye vat and as a result more readily applied to the fibre than the corresponding brominated dihydro-anthraquinone azines.

It is known that chlorinated indanthrones can be prepared by the treatment of N-dihydro-1,2,2',1'-anthraquinone azine in any of a variety of ways, such as by directly chlorinating the parent material in a suitable diluent with chlorine or by the use of such chlorinating agents as thionyl chloride ($SOCl_2$), disulfur dichloride ($S_2Cl_2$), sulfuryl chloride ($SO_2Cl_2$) and other similar non-aqueous chlorine compounds. (See German Patents Nos. 157,449, 287,590, 289,279, 293,971, 296,192, 331,283 and 332,281).

It is further known that N-dihydro-1,2,2',1'-anthraquinone azine or its lower directly halogenized products can be suspended in non-aqueous inorganic halogen compounds and then treated with chlorine. (U. S. Patent No. 1,317,160). The products of this invention are chemically different in structure from those described in any of the patents referred to.

We have found that halogenated N-dihydro-1,2,2',1'-anthraquinone azines containing at least one bromine atom in a 3-position can be treated with chlorinating agents in such a manner that bromine is removed from the molecule and that chlorine enters, we believe, in its place. As a result of this treatment, the dyestuffs obtained show substantial improvement in solubility and when dyed on cotton, produce stronger tints. Among the chlorinating agents that are satisfactory for use in this treatment are thionyl chloride ($SOCl_2$), sulfuryl chloride ($SO_2Cl_2$), disulfur dichloride ($S_2Cl_2$), that is, chlorinating agents containing both sulfur and chlorine.

It could not have been anticipated that when a halogenated N-dihydro anthraquinone azine containing bromine in a 3-position is treated with chlorinating agents as above disclosed, not only does chlorination take place, but some of the bromine in the molecule is removed. This phenomenon makes possible the production of a new series of halogenated indanthrones which, to the best of our knowledge, have not been previously described.

By repeated experimentation with the use of about two moles of chlorinating agent, sulfuryl chloride, to one mole of the 3,3'-dibromo-N-dihydro-1,2,2',1'-anthraquinone azine, we have found that the improved solubility of the final product is influenced not so much by the extent of chlorination taking place as by the amount of bromine liberated.

It is possible to carry out the treatment with chlorinating agents in such a manner that while chlorination takes place no bromine or only scant amounts of bromine are removed. On the other hand, it is possible to conduct our process in such a manner that most of the bromine is removed. In general we have found that in the use of any specific amount of chlorinating agent in our process that the more bromine that is liberated, the more soluble is the resultant product in the vat and the more valuable it is for dyeing purposes.

We have further found, in particular, that when 3,3'-dibromo-N-dihydro-1,2,2',1'-anthraquinone azine is treated in an inert diluent with sulfuryl chloride, the latter body reacts in at least two different ways with the starting material, depending upon the method employed. According to one method of treatment, the sulfuryl chloride reacts substantially as a direct chlorinating agent, the chlorine entering the molecule to form a higher halogenated product, from which substantially no bromine is removed. According to the other method, the sulfuryl chloride enters into a complex formation with the dihydro-anthraquinone azine. That portion of the sulfuryl chloride entering into the complex formation with the dihydro azine, upon subsequent treatment, rearranges in such a manner that practically for each equivalent of chlorine entering the molecule, an equivalent amount of bromine is displaced. Both reactions occur concurrently to some extent and it is with the control of these reactions to give a maximum displacement of the original bromine in the molecule by chlorine that the preferred process of this invention is concerned.

The chemical reaction involved in the preparation of the complex body and its decomposition into the dichloro dihydro azine, starting with 3,3'-dibromo-N-dihydro-1,2,2',1'-anthraquinone azine may be illustrated by the following equations. It should be understood, however, that these equations are inserted merely by way of illustration and that applicants do not desire to be bound in any way by the formulæ or the reactions listed. The structure of the complex body is of a highly theoretical nature and has not yet been substantiated by definite chemical proof.

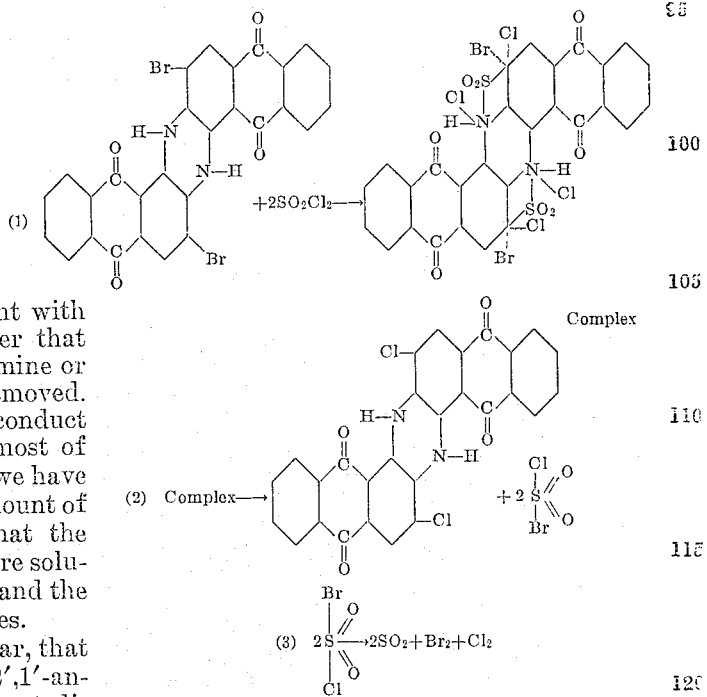

It is therefore a further object of this invention to provide a process of treating 3,3'-dibromo-N-dihydro-1,2,2',1'-anthraquinone azine with sulfuryl chloride to produce as an intermediate step of the process a complex body comprising a loose combination of the dihydro azine with the sulfuryl chloride, this complex body upon further treatment rearranging to give a chlorinated dihydro anthraquinone azine in which substantially all of the bromine has been removed from the molecule.

In its broadest aspect, our invention relates to the treatment of a halogenated N-dihydro-1,2,2',1'-anthraquinone azine containing at least one bromine atom in a 3-position with chlorinating agents in such a manner that varying quantities of the bromine up to substantially all of the bromine are removed. The dyestuffs thus prepared are obtained in the form of dark blue crystalline powders, which may be used for dyeing cotton in shades of blue characterized by the properties not only of being extremely fast to bleaching agents, but furthermore of being substantially more soluble in leuco form and dyeing substantially stronger tints from commercial dye baths than 3,3'-dibromo-N-dihydro-1,2,2',1'-anthraquinone azine.

Examples of halogenated N-dihydro-1,2,2',1'-anthraquinone azines used by us as starting materials are 3,3'-dibromo-N-dihydro-1,2,2',1'-anthraquinone azine and 3'-bromo mono chloro N-dihydro-1,2,2',1'-anthraquinone azine the latter of which may be prepared according to Example 9 below.

In the most specific phase of our invention, in which 3,3'-dibromo-N-dihydro-1,2,2',1'-anthraquinone azine is treated with sulfuryl chloride for the maximum formation of an intermediate complex body, as a step in the process of forming the halogenated indanthrone dyestuff containing a minimum of bromine the general rules to be observed for the assurance of a maximum amount of the indanthrone passing into the intermediate complex are the following:

1. Stirring the reaction mass in the cold after the addition of the sulfuryl chloride until substantially all of the starting material has entered into the complex formation before the mass is heated up.

2. Avoiding an excess of sulfuryl chloride over and above about 2.3 moles per mole of starting material if a dichlorinated product is desired.

3. Carrying out the reaction in the presence of iron, iron chloride, or other bodies containing iron.

4. Repeatedly observing the progress of the reaction by a microscopic examination of the crystals formed during the reaction.

The progress of the formation of the intermediate complex body can be actually followed by the use of a microscope. For example, when nitrobenzene is used as the inert diluent, the starting material 3,3'-dibromo-N-dihydro-1,2,2',1'-anthraquinone azine can be detected as microscopic needles, whereas the intermediate product shows up under the microscope in the form of cubes or plates.

As previously stated, in the preferred form of our invention wherein the intermediate complex body is formed in maximum amounts either 3,3'-dibromo-N-dihydro-1,2,2',1'-anthraquinone azine or other halogenated N-dihydro-1,2,2',1'-anthraquinone azines containing one bromine atom in a 3-position may be used as the starting material. The dyestuffs having the most desirable properties from the standpoint of solubility in the dye bath are those which contain substantially two atoms of chlorine and only a small amount of bromine. We believe that in these products the chlorine is in the 3,3'-positions, respectively. These dyestuffs are in general dark blue crystalline powders. They dye cotton in blue shades remarkably fast to light, washing and bleaching agents, and are further characterized by their excellent solubility in the dye bath.

The intermediate products formed by the treatment of 3,3'-dibromo-N-dihydro-1,2,-2',1'-anthraquinone azine or by the treatment of 3'-bromo-mono-chloro-N-dihydro-1,-2,2',1'-anthraquinone azine in the isolated state appear physically similar. They are obtained from nitrobenzene in the form of small brown plates, which upon exposure to the air decompose with the evolution of sulfuryl chloride and turn green. The intermediate complex body formed from 3,3'-dibromo-N-dihydro-1,2,2',1'-anthraquinone azine and about 2 moles of sulfuryl chloride, for example, can be hydrolyzed by boiling with a 3% solution of caustic soda, or as will later be described, by other saponifying agents, to give a mono-bromo-mono-chloro-anthraquinone azine or the corresponding dihydro anthraquinone azine.

The intermediate complex products both in their isolated form and as a suspension in an inert diluent, are of great utility in the preparation of dyestuffs.

The following examples, in which parts by weight are given, will serve to illustrate preferred embodiments of our invention:

*Example 1*

Into 600 parts of nitrobenzene contained in a vessel provided with an agitator are charged 100 parts of 3,3'-dibromo-N-dihydro-1,2,2',1'-anthraquinone azine and 50 parts of sulfuryl chloride. The stirrer is started and the temperature raised to 70° C. A temperature of 70 to 75° C. is maintained for about 1 to 1½ hours. Chlorination appears to start at about 50° C. and sulfur dioxide escapes. Heating is now continued and the whole mass brought to a temperature of 205 to 210° C. within one hour. The evolution of bromine from the solvent sets in at about 110° C. and is practically complete when the mass is boiling. A temperature of 205 to 210° C. is maintained for about ½ hour and the mass is then cooled to 130 to 140° C., or lower, and filtered at this temperature. The filter cake is washed with about 100 parts of nitrobenzene and the residual nitrobenzene in the cake is removed by steaming. As an alternative method for removing the residual nitrobenzene from the cake, alcohol as a washing medium may be employed.

The washed filter cake is dried and ground. The product obtained dyes cotton in blue shades and is characterized further by the property of being substantially more soluble in the hydrosulfite dye bath and in giving stronger tints than 3,3'-dibromo-N-dihydro-1,2,2',1'-anthraquinone azine. The dyestuff contains both bromine and chlorine.

Example 2

Into 600 parts of nitrobenzene are charged 100 parts of 3,3'-dibromo-N-dihydro-1,2,2',1'-anthraquinone azine and 68 parts of sulfuryl chloride. The mass is stirred and slowly heated to about 70° C. A temperature of 70 to 75° C. is maintained for from 1 to 1½ hours. In this process, reaction seems to set in at about 50° C. and sulfur dioxide escapes. The mass at this point is colored olive. Heating is now continued for about one hour until the temperature reaches 205 to 210° C. This latter temperature is maintained for about ½ hour when the reaction is complete. At a temperature of about 110° C., the escape of bromine begins and is almost complete when the mass reaches the boiling point. The mass is allowed to cool to room temperature and the color body which has completely separated is filtered off. The filter cake is then washed with a small amount of nitrobenzene and the residual nitrobenzene removed as described in Example 1. The washed filter cake is then dried and after grinding is obtained in the form of a blue powder. This product contains more chlorine than the product of Example 1. The product dyes cotton a blue shade and is characterized by the fact that it is substantially more soluble in a technical dye bath and dyes stronger tints than the 3,3' - dibromo - N - dihydro - 1,2,2',1'-anthraquinone azine.

Example 3

Into 600 parts nitrobenzene are charged 100 parts of 3,3'-dibromo-N-dihydro-1,2,2',1'-anthraquinone azine, and 60 parts of technical thionyl chloride are added. The mass is stirred and slowly heated to about 70° C. The temperature of 70 to 75° C. is maintained for 1½ hours. Heating is now continued for about one hour until the temperature reaches 205 to 210° C. This temperature is maintained for about 1½ hours, after which time the reaction is complete. At a temperature of about 110° C. the escape of bromine begins and is about complete when the mass reaches the boiling point. The mass is cooled and worked up as described in Example 2. The product dyes cotton in blue shades possessing greater solubility in the hydrosulfite vat than 3,3'-dibromo indanthrone.

Example 4

75 parts of 3,3'-dibromo-N-dihydro-1,2,2',1'-anthraquinone azine are added to 525 parts of nitrobenzene. There are then added 39 parts of sulfuryl chloride and the mass stirred for about 12 hours at room temperature. There are then added about 3 parts of fine iron dust and the mass heated up in a short time (about 1 hour) to 70° C. The mass is kept at about 70° C. for 1 hour and then heated up to 190 to 195° C. over a period of 3 to 4 hours. The mass is then cooled to about 80 to 90° C. and filtered. The filter cake is washed with a small amount of nitrobenzene. The residual nitrobenzene in the cake is removed either by washing the cake with alcohol or by steam distillation. The filter cake is then dried. The dry product is obtained in the form of a blue powder which will analyze about 14.8% chlorine and 2.7% bromine. Theory for dichloroindanthrone is 13.9% chlorine. The product obtained dyes cotton in blue shades remarkably fast to bleach and is further characterized by its excellent solubility in the dye bath.

Example 5

To 500 parts of nitrobenzene are added 75 parts of 3,3'-dibromo-N-dihydro-1,2,2',1'-anthraquinone azine and 3 parts of iron dust. After the mass has been agitated for a short time, 42 parts of sulfuryl chloride are added and the mass is heated directly to 70° C. within 1 hour and held at about 70° C. for about one hour. The temperature of the mass is then raised to 190 to 195° C. within 3 hours. During the step of heating up above 70° C. vapors of bromine, sulfur dioxide, hydrobromic acid and hydrochloric acid are evolved. The bromine apparently begins to escape at about 110° C., at which point the mass becomes quite thick and should be agitated thoroughly. The mass is held at 190 to 195° C. for about 1 hour and is then cooled to 70 to 80° C. and filtered at 70 to 80° C. The filter cake is washed with about 150 parts of nitrobenzene and a little alcohol to remove nitrobenzene. The dyestuff obtained is practically identical with that obtained in Example 4.

Example 6

To 500 parts of nitrobenzene are added 75 parts of 3,3'-dibromo-N-dihydro-1,2,2',1'-anthraquinone azine and 3 parts of iron dust. After the mass has been agitated for a short time, 42 parts of sulfuryl chloride are added and the mass is heated directly to 70° C. within 1 hour and held at about 70° C. for about one hour. The temperature of the mass is then raised to 120° C. within 1½ hours. During the heating up step above 70° C. vapors of bromine, sulfur dioxide, hydrobromic and hydrochloric acid are evolved. The bromine apparently begins to escape at about 110° C. at which point the mass becomes quite thick and should be agitated thoroughly. The mass is held at 120° for about 1 hour and is then cooled to 70 to 80° C. and filtered at 70 to 80° C. The filter cake is washed with about 150 parts of nitrobenzene and a little alcohol to remove nitrobenzene. The dyestuff obtained is practically identical with that obtained in Example 4.

*Example 7*

Into 750 parts of dichlorobenzene (liquid) are added 75 parts of 3,3'-dibromo-N-dihydro-1,2,2',1'-anthraquinone azine 42 parts of sulfuryl chloride and 3 parts of iron dust. The mass is agitated at room temperature for about 72 hours, then heated up to about 70° C. over a period of about 1 hour and held at 70 to 75° C. for about 1 hour. It is then heated to 170 to 175° C. over a period of 3 to 4 hours and held at 170 to 175° C. for about 1 hour, cooled to 80 to 90° C. and filtered. The dichlorobenzene is removed from the filter cake either by steam distilling or by washing with alcohol. The dyestuff obtained contains 14.77% chlorine and 4.26% bromine in organic combination.

*Example 8*

The procedure is carried out exactly as in Example 5, except instead of using 3 parts of iron, there are employed 5 parts of anhydrous ferric chloride. The dyestuff is practically identical to that obtained in Example 4.

*Example 9*

Into 525 parts of nitrobenzene are added 75 parts of 3,3'-dibromo-N-dihydro-1,2,2',1'-anthraquinone azine and 51 parts of sulfuryl chloride. The mass is heated up to 70° C. within about 1 hour and kept at 70° C. for 1½ to 2 hours. It is then cooled to room temperature and filtered. The filter cake, comprising the intermediate complex body, is washed with about 200 parts of nitrobenzene and then charged without delay and unnecessary exposure to the air into 500 parts of dry nitrobenzene. The mass is heated to about 190 to 195° C. within 1½ to 2 hours, keeping the temperature at 190 to 195° C. for about ½ hour and then cooled to 80 to 90° C. and filtered. The residual nitrobenzene is steam distilled from the filter cake which is then filtered and dried. The chlorinated indanthrone obtained contains 14.3% chlorine and 2.08% bromine.

The intermediate product which is filtered off is in the form of very small brown plates. Upon exposure to the air this product decomposes turning green with the evolution of sulfuryl chloride. We believe the intermediate product contains 2 moles of sulfuryl chloride to one mole of the anthraquinone azine body. Upon saponification of the intermediate body with 3% caustic soda solution at the boiling point of the solution it is transformed into an azine which shows an analysis of 6.42% chlorine, 15.48% bromine. The theoretical amount for mono-chloro-mono-bromo-anthraquinone azine is 6.4% chlorine and 14.4% bromine. The azine obtained is transformed into the dihydro azine by any of the known methods applicable to the reduction of similar bodies, as for example, by pasting up in concentrated sulfuric acid and then diluting with water to obtain a fine suspension and then washing this product free of acid with water. The finely divided azine is then reduced with sodium sulfide solution to the hydroazine form and may be filtered off. We believe that the product obtained is a 3'-bromo-mono-chloro-N-dihydro-1,2,2',1'-anthraquinone azine.

*Example 10*

20 parts of the 3'-bromo-mono-chloro-N-dihydro-1,2,2'-1'-anthraquinone azine which may be prepared according to Example 9 are added to 150 parts of dry nitrobenzene and while the mass is being agitated 10 parts of sulfuryl chloride are added at 25 to 30° C. The mass is stirred for 12 hours at room temperature and is then heated to 70° C. within 1 hour. The temperature is kept 70° C. for 1 hour and is then heated to 190 to 195° C. within about 3 hours. The mass is cooled to 80 to 90° C. and filtered. The washing of the cake is performed as in Example 1. The product as respects its dyeing properties is substantially identical with that obtained in Example 4. It contains 17.82% chlorine and 2.95% bromine.

*Example 11*

The procedure is the same as in Example 10, except that 1 part of iron is added after the mass has been stirred for 12 hours at room temperature. The product obtained contains less chlorine than that prepared according to the process described in Example 10.

*Example 12*

The procedure of Example 10 is followed substantially up to and including the step of keeping the reaction mass at 70° C. for 1 hour. The mass is then cooled to 25 to 30° C., and the crystalline precipitate is filtered off and washed with nitrobenzene until free from uncombined sulfuryl chloride. The product, in its physical properties, is similar to the intermediate product obtained in Example 9. We believe that it is a complex compound of 3'-bromo-mono-chloro-N-dihydro-1,2,2',1'-anthraquinone azine and sulfuryl chloride and contains 2 moles of sulfuryl chloride to one mole of the indanthrone.

Example 13

The procedure of Example 5 is followed substantially up to and including the step of keeping the reaction mass at 70° C. for 1 hour, whereupon the same turns a reddish brown and is of a thin consistency. If the mass is examined microscopically it is found to contain microscopic plates in contrast to the suspension of the starting material, which is in the form of small needles. No hydrochloric acid is evolved by heating to 70° C. The mass may be either heated to 110° C. or slightly above, at which point the product is transformed into a dyestuff, or the mass may be cooled to room temperature and filtered and washed with a small amount of nitrobenzene. The isolated product decomposes on exposure to air giving off sulfuryl chloride and changing from reddish brown in color to green.

Example 14

The procedure of Example 4 is followed substantially up to and including the step of keeping the reaction mass at 70° C. for 1 hour. At the end of the 12 hours stirring at room temperature, the mass will be observed to have changed into a reddish brown color; and if examined microscopically it will be found that about 90% of the original starting material has been changed into the intermediate product. If at the end of the keeping for one hour at 70° C., the mass is again examined under the microscope, it will be found to be completely converted to the intermediate product. Further treatment as in Example 4 results in the product of Example 4.

Example 15

60 parts of 3,3'-dibromo-N-dihydro-1,2,-2',1'-anthraquinone azine are added to 420 parts of dry nitrobenzene and there are then added 34 parts of sulfuryl chloride, the mass being stirred after the latter addition at room temperature for 12 hours. The mass is then heated within 1 hour to 50 to 60° C. and kept within this temperature range until a microscopic test sample shows complete formation of the complex body, that is, all brown plates with no blue needles. This requires from 1 to 3 hours holding at 50 to 60° C. The mass is then cooled to 40° C. and there are added 100 parts of aniline over a period of ½ to 1 hour, maintaining the temperature at 40° with cooling means if necessary. The mass is then heated within 2 to 3 hours to 180° C. and kept at about 180° C. for ½ hour, after which it is cooled to 60 to 80° C. and the mass filtered. The filter cake is washed with about 100 parts of nitrobenzene and then steam distilled to remove the nitrobenzene in the presence of water. The product is filtered and washed with water and dried.

The product obtained by the process just described is mono-chloro-mono-bromo-N-dihydro-1,2,2',1'-anthraquinone azine, having the following analysis: 14.94% bromine and 6.83% chlorine as contrasted with a theoretical analysis for mono-chloro-mono-bromo-N-dihydro-1,2,2',1'-anthraquinone azine of 14.4% bromine and 6.23% chlorine. This product is most probably 3-bromo-3'-chloro-N-dihydro-1,2,2',1'-anthraquinone azine.

According to the above process of saponifying the intermediate complex body with aniline, it should be noted that the aniline acts not only as a saponifying agent but also as a reducing agent to form the dihydro azine directly.

If instead of using the amounts of sulfuryl chloride as specified in Examples 4 and 5, an amount less than 2.3 moles per mole of the dibromo-indanthrone is used, the product obtained after transformation will contain a certain proportion of the dyestuff obtained by the process decribed in Examples 4 and 5, together with a certain amount of unchanged 3, 3'-dibromo-N-dihydro-1,2,2',1'-anthraquinone azine. If in the same processes described in the Examples 4 and 5, an amount of sulfuryl chloride is used equal to about 2.3 to 4 moles for each mole of the starting material, then the dyestuff is substantially identical with that obtained in Examples 4 and 5, but if, in using the higher ratios of sulfuryl chloride (2.3 to 4 moles) to one mole of the starting material as in Examples 4 and 5, iron is omitted, then the resultant indanthrone dyestuff contains considerably more than two atoms of chlorine per molecule. In particular, if 4 moles of sulfuryl chloride are used and iron is omitted, the product obtained is substantially a trichloro indanthrone.

While as we have stated below, the use of a purified 3, 3'-dibromo-N-dihydro-1, 2, 2', 1'-anthraquinone azine gives substantially better results than the use of the crude product obtained by condensing 1,3-dibromo-2-amino-anthraquinone, it is not essential to use a purified product, since any degree of purification of the final dyestuff can be ultimately had by purification from sulfuric acid.

In general, for the satisfactory formation of the intermediate complex body, comprising the loose combination of the dihydro anthraquinone azine with sulfuryl chloride, the initial temperatures for the formation of this complex body should be below 80° C. and preferably, as in the above examples, for the complete formation a final temperature of around 70 to 75° C. Above 90° C. the amount of the complex body formed is very slight and proportionally less as the temperature is increased.

In connection with the saponification of the intermediate complex body, as described in Example 9, it may be pointed out that other saponifying agents, as for instance caustic potash, aniline and the like, may be employed. The use of aniline gives directly the dihydroazine.

It has been observed, if 3,3'-dibromo-N-dihydro-1,2,2',1'-anthraquinone azine in an inert solvent as in the above examples is treated with sulfur-chloride compounds, for instance sulfuryl chloride at initial temperatures substantially above 150° C., say 180° C., that chlorination mainly takes place without removing sufficient bromine for any enhanced solubilization of the resulting product in the dye bath. Our preferred method of treating the starting materials with the chlorinating agents above enumerated is to cause the greater part of the reaction to take place at the lowest temperatures possible, around room temperature, and then to complete the reaction by heating to more elevated temperatures.

We have also noted that by varying the amount of the chlorine compound used, products of varying composition and characteristics are obtained. For instance, the use of only one mole of sulfuryl chloride per mole of 3,3'-dibromo-N-dihydro-1,2,2',1'-anthraquinone azine is sufficient to greatly improve the dyestuff with respect to its solubility in the dye bath over the starting material. We have also found that starting with a highly purified 3,3'-dibromo-N-dihydro-1,2,2',1'-anthraquinone azine gives improved results over starting with an unpurified product obtained by condensing 1,3-dibromo-2-aminoanthraquinone.

Other inert diluents than nitrobenzene that have high boiling points, are liquid at low temperatures and are not readily chlorinated, such as ortho dichloro benzene, may be employed.

We have found that as the residual quantity of bromine in the dyestuff being treated is diminishing, the removal of further amounts of bromine becomes increasingly difficult. We therefore do not find it practical to carry the displacement of bromine to completion. Fortunately, this is not necessary, for we have found that a product containing a total of not over 20% halogen, of which not more than about 5% is bromine, has very excellent solubility in the dye bath, while at the same time being very fast to light, washing and to bleach.

In the claims below it should be understood that where new products, dyestuffs, or articles of manufacture are claimed, we mean to include those bodies not only in substance, but also in whatever state they exist when applied to materials dyed, printed or pigmented therewith.

By the phrase "milder conditions than those leading to direct chlorination" as used in the claims below, we are referring to those conditions which are generally used in the art to control the rate and extent of a chlorination reaction. Such conditions include and may be exemplified by the use of low temperatures during the initial stages of the reaction; the avoidance of excess chlorinating agent; the use of catalysts, such as for example iron, which tend to decompose the excess chlorinating agent or which tend to inhibit chlorination; and in general avoiding intensifying such conditions as are generally known to favor direct chlorination, as will be readily understood to those skilled in the art.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing halogenated indanthrones, which comprises treating N-dihydro-1,2,2',1'-anthraquinone azine substituted in at least one of the 3-positions by bromine with chlorinating agents under conditions milder than those leading to direct chlorination whereby to produce an intermediate complex addition product between the N-dihydro-1,2,2',1'-anthraquinone azine and the chlorinating agents, and thereafter decomposing said complex addition product with the elimination of bromine.

2. The process of preparing halogenated indanthrones, which comprises treating 3,3'-dibromo-N-dihydro-1,2,2',1'-anthraquinone azine with chlorinating agents containing both sulfur and chlorine under conditions milder than those leading to direct chlorination whereby to produce an intermediate complex product between the N-dihydro-1,2,2',1'-anthraquinone azine and the chlorinating agents, and thereafter decomposing said complex addition product with the elimination of bromine.

3. The process of preparing halogenated indanthrones, which comprises treating N-dihydro-1,2,2',1'-anthraquinone azine substituted in at least one of the 3-positions by bromine in an inert diluent with chlorinating agents containing both sulfur and chlorine under conditions milder than those leading to direct chlorination whereby to produce an intermediate complex addition product between the N-dihydro-1,2,2',1'-anthraquinone azine and the chlorinating agents, and thereafter decomposing said complex addition product with the elimination of bromine.

4. The process of preparing halogenated indanthrones, which comprises treating 3,3'-dibromo-N-dihydro-1,2,2',1'-anthraquinone azine in an inert diluent with chlorinating agents containing both sulfur and chlorine under conditions milder than those leading to direct chlorination whereby to produce an intermediate complex addition product between the N-dihydro-1,2,2',1'-anthraquinone azine and the chlorinating agents, and thereafter decomposing said complex addition product with the elimination of bromine.

5. The process of preparing a halogenated indanthrone, which comprises treating a halogenated N-dihydro-1,2,2',1'-anthraquinone azine containing at least one atom of bromine in one of the 3-positions in an inert diluent with sulfuryl chloride under conditions milder than those leading to direct chlorination whereby to produce an intermediate complex addition product between the N-dihydro-1,2,2',1'-anthraquinone azine and the sulfuryl chloride, and thereafter decomposing said complex addition product with the elimination of bromine to produce a chlorinated indanthrone.

6. The process of preparing a halogenated indanthrone, which comprises treating 3,3'-dibromo-N-dihydro-1,2,2',1'-anthraquinone azine in an inert diluent with sulfuryl chloride under conditions milder than those leading to direct chlorination whereby to produce an intermediate complex addition product between the N-dihydro-1,2,2',1'-anthraquinone azine and the sulfuryl chloride, and thereafter decomposing said complex addition product with the elimination of bromine to produce a chlorinated indanthrone.

7. The process of preparing a halogenated indanthrone, which comprises treating 3,3'-dibromo-N-dihydro-1,2,2',1'-anthraquinone azine in an inert diluent with sulfuryl chloride and a body containing iron at temperatures below about 90° C. to practically completely transform the indanthrone body into an intermediate complex compound comprising the starting material and sulfuryl chloride and thereafter treating the intermediate complex at relatively higher temperatures to eliminate bromine in substantial quantities and produce a chlorinated indanthrone.

8. As new products, halogenated indanthrone dyestuffs containing both bromine and chlorine, the bromine being in one of the 3-positions, said dyestuffs being substantially more soluble in the dye bath and dyeing stronger tints under large scale practical dyeing conditions than 3,3'-dibromo-N-dihydro-1,2,2',1'-anthraquinone azine, and being obtainable by treating 3,3'-dibromo-N-dihydro-1,2,2',1'-anthraquinone azine with chlorinating agents under conditions favoring a removal of bromine from the molecule.

9. As new products, halogenated indanthrone dyestuffs containing both bromine and chlorine, the bromine being in one of the 3-positions, said dyestuffs being substantially more soluble in the dye bath and dyeing stronger tints under large scale practical dyeing conditions than 3,3'-dibromo-N-dihydro-1,2,2',1'-anthraquinone azine and being obtainable by treating a halogenated N-dihydro-1,2,2',1'-anthraquinone azine containing at least one bromine atom in a 3-position with chlorinating agents under conditions favoring a removal of bromine from the molecule.

10. As a new composition of matter, a chlorinated indanthrone dyestuff comprising halogenated N-dihydro-1,2,2',1'-anthraquinone azine containing both chlorine and bromine, the latter being in a 3-position, which in the dry state is a dark blue powder dyeing cotton in blue shades remarkably fast to light, washing and bleach, and which may be prepared by treating 3,3'-dibromo-N-dihydro-1,2,2',1'-anthraquinone azine in an inert diluent with sulfuryl chloride under conditions favoring the practically complete formation of the intermediate complex comprising the indanthrone starting material and sulfuryl chloride and thereafter treating the intermediate complex under conditions whereby substantial quantities of bromine are eliminated and a chlorinated indanthrone is obtained.

11. As a new composition of matter, a halogenated indanthrone comprising halogenated N-dihydro-1,2,2',1'-anthraquinone azine containing both chlorine and bromine, the latter being in a 3-position, containing a total halogen content equivalent to not more than 20% by weight, of which not more than 5% is bromine and the remainder chlorine and which may be prepared by treatment of 3,3'-dibromo-N-dihydro-1,2,2',1'-anthraquinone azine in an inert diluent with sulfuryl chloride under conditions favoring the practically complete formation of the intermediate complex body comprising the indanthrone and sulfuryl chloride and thereafter heating the mass to about 190° C. whereby the chlorinated indanthrone is obtained.

In testimony whereof we have hereunto subscribed our names at Carrollville, Milwaukee County, Wisconsin.

JOSEPH DEINET.
ROBERT J. GOODRICH.
OTTO STALLMANN.